(12) United States Patent
Cheung et al.

(10) Patent No.: US 10,229,655 B2
(45) Date of Patent: Mar. 12, 2019

(54) CONTEXTUAL ZOOM

(71) Applicant: Microsoft Technology Licensing, LLC, Redmond, WA (US)

(72) Inventors: Chairy Cheung, Sammamish, WA (US); Taurean Jones, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 512 days.

(21) Appl. No.: 14/634,796

(22) Filed: Feb. 28, 2015

(65) Prior Publication Data

US 2016/0253982 A1    Sep. 1, 2016

(51) Int. Cl.
*G06F 3/048* (2013.01)
*G09G 5/373* (2006.01)
*G06F 3/0484* (2013.01)
*G06F 17/21* (2006.01)
*G06F 17/24* (2006.01)
*G06T 3/40* (2006.01)

(52) U.S. Cl.
CPC .......... *G09G 5/373* (2013.01); *G06F 3/0484* (2013.01); *G06F 3/04845* (2013.01); *G06F 17/212* (2013.01); *G06F 17/245* (2013.01); *G06F 17/246* (2013.01); *G06T 3/40* (2013.01); *G06F 2203/04806* (2013.01); *G09G 2340/045* (2013.01)

(58) Field of Classification Search
CPC ............................................. G06F 2203/04806
See application file for complete search history.

(56) References Cited

U.S. PATENT DOCUMENTS

| | | |
|---|---|---|
| 6,317,750 B1 | 11/2001 | Tortolani et al. |
| 7,552,398 B2 | 6/2009 | Bier et al. |
| 8,095,434 B1 | 1/2012 | Puttick et al. |
| 2003/0197718 A1 | 10/2003 | Venolia |
| 2011/0316884 A1 | 12/2011 | Giambalvo et al. |
| 2012/0180002 A1 | 7/2012 | Campbell et al. |
| 2012/0324357 A1* | 12/2012 | Viegers ................. G06F 3/0481 715/730 |
| 2013/0067391 A1 | 3/2013 | Pittappilly et al. |

(Continued)

OTHER PUBLICATIONS

Haller, et al., "iMapping—A Zooming User Interface Approach for Personal and Semantic Knowledge Management", In Proceedings of the 21st ACM Conference on Hypertext and Hypermedia, Jun. 13, 2010, 10 pages.

(Continued)

*Primary Examiner* — Justin S Lee

(74) *Attorney, Agent, or Firm* — Workman Nydegger

(57) ABSTRACT

Disclosed herein is a system and method for allowing a user to zoom in and out on a large data set and maintain resolution and understanding on the data. The system monitors how the user uses the data and also detects the user's actions with respect to zooming on the data. Based on the user's interactions and the type of data the system determines for each zoom level what data to display to the user on the display and if the display needs to be modified to maintain usability of the data. In some scenarios a display management component may change the format of the data such that the user may better understand the data.

20 Claims, 7 Drawing Sheets

(56) References Cited

U.S. PATENT DOCUMENTS

| | | | |
|---|---|---|---|
| 2013/0067398 A1* | 3/2013 | Pittappilly | G06F 3/0482 715/800 |
| 2013/0191778 A1 | 7/2013 | Peters et al. | |
| 2014/0109012 A1 | 4/2014 | Choudhary et al. | |
| 2015/0363960 A1* | 12/2015 | Babcock | G06T 13/00 345/473 |

OTHER PUBLICATIONS

Diep, et al., "Visualizing E-mail with a Semantically Zoomable Interface", In Proceedings of IEEE Symposium on Information Visualization, Oct. 10, 2004, 2 pages.

Jou, Chichang, "Automatic Web Table Transcoding for Mobile Devices Based on Table Classification", In Proceedings of IADIS International Conference Internet Applications and Research, Jul. 22, 2011, 8 pages.

"Guidelines for Semantic Zoom", Retrieved on: Sep. 17, 2014 Available at: http://msdn.microsoft.com/en-in/library/windows/apps/hh465319.aspx, 6 pages.

Suh, et al., "OZONE: A Zoomable Interface for Navigating Ontology Information", In HCIL Tech Report #2001-04, Apr. 2001, 13 pages.

Champion, Tony, "Semantic Zoom with Silverlight 5 PivotViewer", Published on: Feb. 9, 2012 Available at: http://visualstudiomagazine.com/Articles/2012/09/01/Semantic-Zoom.aspx?Page=2, 4 pages.

"Steven Hollidge: Insights of a Full Stack Developer Semantic Deep Zoom with the PivotViewer", Retrieved from <<http://stevenhollidge.blogspot.in/2012/11/semantic-deep-zoom-with-pivotviewer.html>>, Nov. 18, 2012, 4 Pages.

"International Search Report and Written Opinion Issued in PCT Application No. PCT/US2016/019997", dated May 27, 2016, 12 Pages.

Sabnis, Mahesh, "Windows 8: Working with Semantic Zoom using C# and XAML", Retrieved from <<http://www.dotnetcurry.com/windowsapp/864/semantic-zoom-csharp-xaml-windows-store-app>>, Feb. 13, 2013, 7 Pages.

* cited by examiner

FIG. 3

| Header 1 | Header 2 | Header 3 | Header 4 | Header 5 | Header 6 | Header 7 | Header 8 | Header 9 |
|---|---|---|---|---|---|---|---|---|
| 1 | a | ab | 124 | abc | 585 | dfg5 | 467890 | fghj |
| 2 | b | ba | 367 | djy | 4567 | gfd43 | 98765 | jhgfd |
| 3 | c | cz | 9654 | kgfx | 7654 | hge4 | 3456 | jhgf |
| 4 | d | zv | 357 | kte | 9876 | jt45 | 0987 | lk |
| 5 | e | ty | 256 | rhjki | 9876 | dfghjk8 | 2345 | lkjh |
| 6 | f | yu | 3567 | gie | 45 | gf3 | 0987 | gfd |

301 302 303 304 305 306 307 308 309

351 352 353 354 355 356

300

390

| Header 1 | Header 2 | Header 3 | Header 4 | Header 5 | Header 6 | Header 7 | Header 8 | Header 9 |
|---|---|---|---|---|---|---|---|---|
| 1 | a | ab | 124 | abc | 585 | dfg5 | 467890 | fghj |
| 2 | b | ba | 367 | djy | 4567 | gfd43 | 98765 | jhgfd |
| Header 10 | Header 11 | Header 12 | Header 13 | Header 14 | Header 15 | Header 16 | Header 17 | Header 18 |
| ety | 2345 | fghj | 765 | sdfgh | 2456 | 34578 | 36789 | 3456 |
| wert | 765 | gfhjk | 0987 | 6543 | jhgf | cjydf | hgvfcd | gfds |
| Header 19 | Header 20 | Header 21 | Header 22 | Header 23 | Header 24 | Header 25 | Header 26 | Header 27 |
| 2345 | fghj | 24564 | dfhjki | fgsa | 3567 | gfds | 347uo9 | 35678 |
| 5432 | juytr | 8754323 | gjtgeds | dfgjyu | 4679 | gf3 | 6543g | jtyr5 |

*FIG. 4*

CONTEXTUAL ZOOM

BACKGROUND

Users typically interact with large data sets in a variety of ways. These data sets are often presented or displayed to the user on a display in a manner that prevents the user from viewing all of the data in the data set or source. In order to interact with this data and see the entirety of the data the user either scrolls across the display to see the information or zooms the display in or out to see more or less of the data in the display. Typically the data that is displayed to the user is simply a larger or smaller version of the data relative to the prior size that was previously displayed.

However, when users zoom data in or out they often lose the ability to retain resolution on the data. This is because as they zoom out on a data set the data becomes so small that the user cannot read or understand the data that is presented. Even users who are familiar with the data set may have difficulty locating or understanding the data when the resolution of the data is lost due to the zooming action. This inability to view or use the data is frustrating and causes significant time to be wasted by users as they struggle to understand the data that is before them.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for allowing a user to zoom in and out on a large data set and maintain resolution and understanding on the data. The system monitors how the user uses the data and also detects the user's actions with respect to zooming on the data. Based on the user's interactions and the type of data the system determines for each zoom level what data to display to the user on the display. This data could be a summary of the data, a portion of the data or certain useful information contained in the data. The system can also based on the monitored activity and the contextual understanding of the data reorder the data that is presented to the user on the display. For example header rows can be presented to the user instead of the actual data, or certain less valuable or less informative rows may be removed from the display as the user changes the zoom level. A display management component uses this information to render a display of the data to the user such that the information displayed to the user is presented in a manner that allows the user to understand at some level the underlying data. In some scenarios the display management component may change the format of the data such that the user may better understand the data. For example data may be converted from text to a graphical format when the user zooms out on a spreadsheet.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3 is an exemplary screen shot illustrating data presented in a spreadsheet at a maximum zoom.

FIG. 4 is an exemplary screen shot illustrating data presented in a spreadsheet at an intermediate zoom level.

Like reference numerals are used to designate like parts in the accompanying drawings.

DETAILED DESCRIPTION

Figure 1:
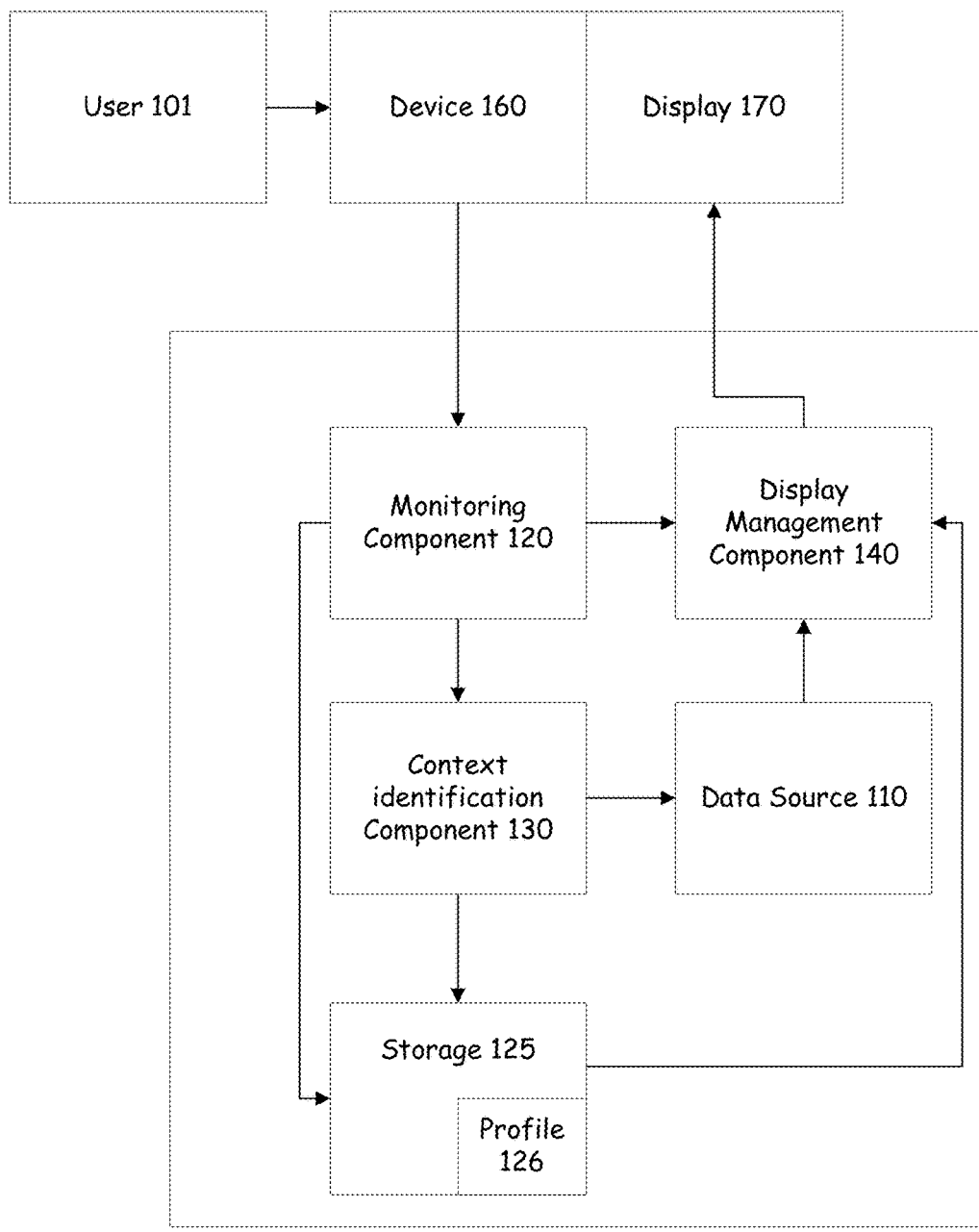
FIG. 1 is as block diagram illustrating components of a contextual zooming system according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media or computer readable storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media, but not computer storage media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a block diagram illustrating components of a contextual zoom system 100 according to an illustrative example. System 100 includes a data source 110, a monitoring component 120, a context identification component 130 and a display management component 140. System 100 connects with a device such as device 160 having a display 170.

Data source 110 is any data that can be displayed to the user in a structured manner. Typically this structured manner is when the data is presented to a user in a table form, such as in a spreadsheet. When the data source 110 is presented in a table the data source 110 may have header rows that contain information related to the data contained in that column. This information can for example explain that all of the information in a particular column relates to a specific item of information. Likewise in a table each row typically represents an entry related to a single record. Each cell in the table represents a single piece of data or entry for the record. Thus, when a user views the table on a display, such as display 170, they are able to view a record or multiple records in the table and readily understand what the meaning of each entry in the record. It should be noted that in some tables the headers may be at the beginning of a row and the columns represent a single record. In other tables both the columns and the rows may contain headers such as with a summary table or comparison table (e.g. comparing various sales of items over a number of years, or highlighting performance statistics for various groups at different companies). When viewing a large dataset having many rows and columns it is often impossible to see all of the data contained in the table. This inability to view the table may be caused by the size of the display being used by the user, the sheer number of entries in the table, or other reasons.

As mentioned above, data source 110 does not have to be a table, but can be any type of data that is used by a user that can be presented to the user in a structured manner. While the present discussion discusses the data source as a structured data source, the ideas and embodiments can also be applied to unstructured data which can be visually represented. For example, common properties for entities in the unstructured data could be displayed when the data is zoomed out. In some embodiments the data source 110 is photos that the user has stored. These photos may have associated metadata with them that permits the system to present the photos to the user in a structured manner. For example, the photos may include data tags indicating where the photo was taken, when the photo was taken, who is in the photo, etc. In some embodiments the data source 110 is a document, such as a word processing document. In some embodiments the data source 110 is a presentation document such as a PowerPoint presentation. In each of these examples the data source 110 can be such a large amount of data that the user is unable to view the entirety of the data set at once and have the data displayed in a legible and understandable manner.

As the present disclosure uses structured data as the data source 110 that is displayed to the user the way that data is displayed can be manipulated by the system to provide the user with higher level views of the data while maintaining the a level of understanding about the underlying data for the user. These higher level views can be provided to the user through zooming actions. These actions make the associated data either larger or smaller in size to the user.

Monitoring component 120 is a component of the system that monitors the user's activity with the data source 110. The monitoring component 120 detects how the user is interacting with the data in the data source 110. The user may perform any number of actions on the data and each of these actions may be useful for the system to be aware of. For example the user may be editing a particular column in a table over a period of time. This can be noted by the monitoring component 120 and then later used as an indication of an importance of the column to the user. Other interactions that may be captured by the monitoring component 120 include editing actions, zooming actions, navigation actions, etc. Editing actions can include actions taken by the user to change or modify the data in the data source 110. Depending on the data in the data source 110 different types of editing actions may be permitted. Zooming actions are actions taken by the user to either expand out their view of the data or narrow down their view of the data. When dealing with a zooming action the monitoring component 120 may make note of where the user was in the data when the action was taken and where the user ended up following the action. This information provides some insight as to the level of detail that the user was looking for at that moment in time. Navigation actions are actions taken by the user to move around within the data source 110. Navigation actions can include changing pages, jumping pages, panning, scrolling, advancing, moving between tabs, etc. within the data source 110. Each of the various actions can be collected independently of each other by the monitoring component 120 or they can be collected as a single event by the monitoring component 120. Each action can be used to assist in the determination of what information in the data source 110 is important to the user.

Monitoring component 120 also is configured to provide the detected zooming actions to the display management component 140 as the user zooms. The data provided to the display management component 140 related to the zooming action may be different data than is used to create or maintain the profile. In some embodiments the monitoring component 120 may capture additional information related to the zooming action to provide to the display management component 140. This information can include the method of the zooming action (e.g. using keyboard keys, mouse wheel, or gestures), the rate of the zooming action (e.g. extremely fast, slow, etc.), the location of a cursor when the zooming action occurred, and/or where the zooming action occurred on the display.

This information that is collected by the monitoring component 120 is stored in a profile 126 in storage 125. The profile 126 may be a profile that is specific to the user, may be specific to the data source 110, or both. In some embodiments, multiple profiles may be maintained for a single data source 110. In some embodiments the same profile may be maintained for more than one data source 110. This may occur when the two data source 110s are related in some way (e.g. two versions). In other embodiments the profile 126 may be augmented or enhanced with information originating from other profiles. For example, the profile 126 can be augmented with profile information for the user from the user's own social networking profiles. This information can further assist in the determination of the contextual zoom.

Context identification component 130 is a component of the system that is configured to identify contextual information within the data source 110 that allows for the system to display contextually relevant information when the user zooms their view of the data in the data source 110. Contextual information can be any information in the data source 110 that allows for the user to understand at least a portion the underlying data when the user has zoomed out from the data to a level where the data in the data source 110 cannot be viewed completely.

To identify the contextual information in the data source 110 the context identification component 130 reads or otherwise analyzes the information in the data source 110. The contextual identification component can implement a semantic analysis of the data source 110 to identify or understand what the data source 110 is about. Using semantic analysis the contextual identification component can identify words and phrases in the data source 110 that are informative about the content of the data source 110. Depending on the type of data source 110 the contextual identification component may use or access metadata related to the data source 110 to identify additional contextual information. For example, when the data source 110 is a table or spreadsheet the contextual identification component can identify the headers of the table and can also identify any tabs that are associated with the table or spreadsheet. The context identification component 130 may further identify any words associated with the headers and tabs to gain further contextual understanding of the data source 110. This information can be stored for the data source 110 in storage 125 in a separate profile for the data source 110 or in the profile 126 that was created or generated by the monitoring component 120 for the user or the data source 110.

Figure 2:
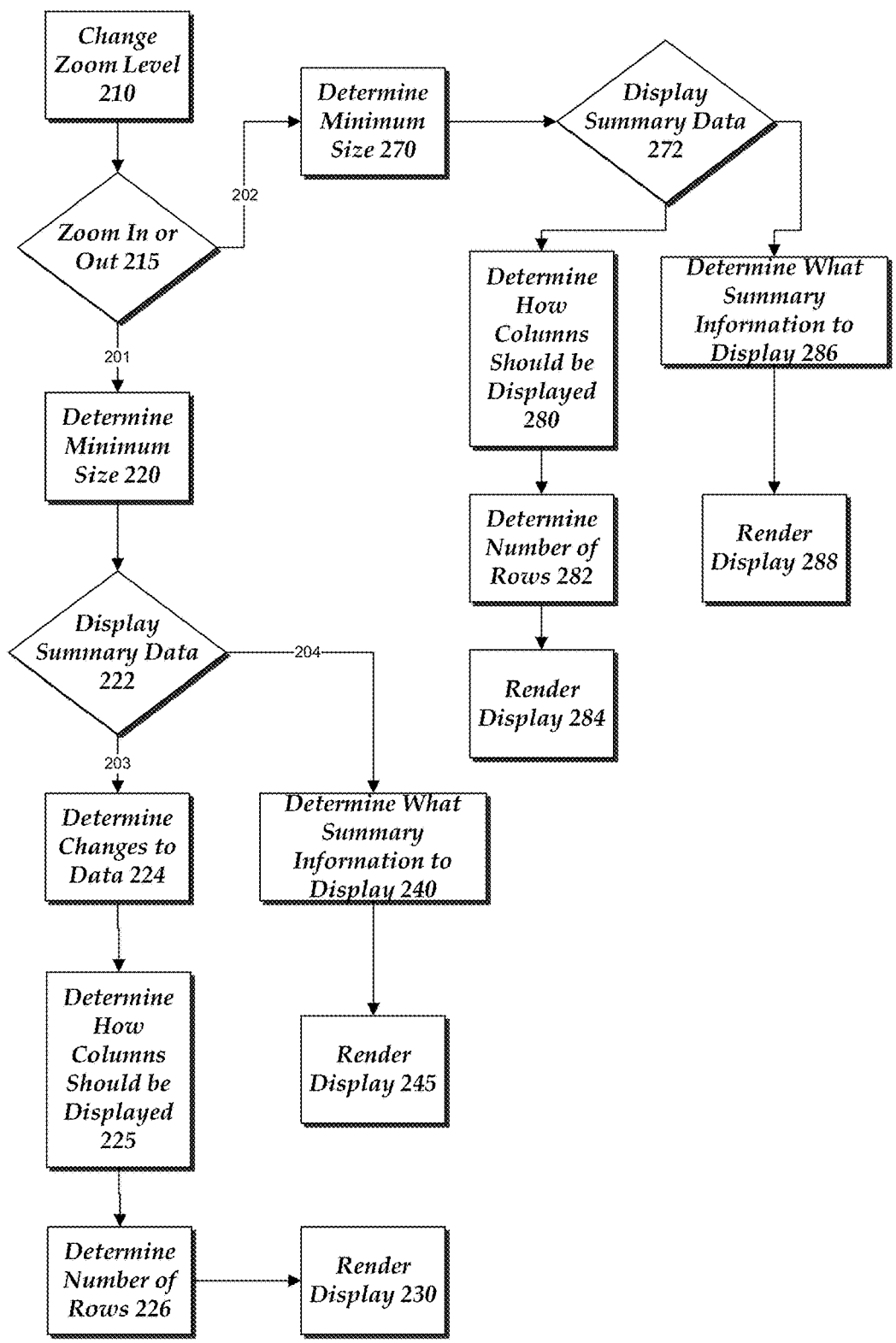
FIG. 2 is a flow diagram illustrating a process executed by the display management component for displaying the data at various zoom levels.

The display management component 140 is a component of the system that is configured to determine and manage the arrangement of the display of the data in the data source 110 to the user through the display 170 of device 160. The display management component 140 receives from the monitoring component 120 information indicating that the user is changing the zoom level of the data in the data source 110 that they are viewing on the display. This zoom level change can be either a zoom in or a zoom out. The display management component 140 uses the information received from the monitoring component 120 about the changed zoom level to begin a process for determining how the display should be updated to reflect the user's desired change in the zoom level. The process executed by the display management component 140 for displaying is illustrated by the flow diagram of FIG. 2.

As mentioned the process of adjusting the zoom level of the data source 110 occurs when the user indicates their desire to change the zoom level on the display. This is illustrated at step 210. The user can indicate this desire to change the zoom level by performing an action on the display device. This action can be moving a scroll bar such as scroll bar 390 illustrated in FIG. 3 in a direction that indicates either increased or decreased zoom level, can be a selection of an increase zoom or decrease zoom buttons (such as a + or − button), selecting a desired zoom level (such as from a drop down of available zoom levels), using a gesture such as a pinch on a touch screen to indicate the desire to change zoom level or any other method provided on the display for changing the zoom level. It should be noted that in FIG. 3 the table 300 is at maximum zoom as indicated by scroll bar 390. However, the scroll bar could be at any particular zoom level or location. Additionally or alternatively the user may indicate a desire to change the zoom level by providing an input from a keyboard or a mouse that indicates the level of the desired zoom. The monitoring component 120 captures this information and provides this information to the display management component 140.

The display management component 140 takes the information from the monitoring component 120 and determines whether the user is zooming in or zooming out. This is illustrated at step 215. Depending on the desire to zoom in or zoom out the display management component 140 can perform different functions in managing the display that will be displayed to the user.

If the user indicated a desire to zoom out from the current view the display management component 140 follows along the path indicated by line 201. If the user indicated a desire to zoom in from the current view the display management component 140 follows along the path indicated by line 202. The discussion herein will first proceed along the path indicated by line 201. For purposes of this discussion it will be presumed the data source 110 is a table. However, any other data source 110 may be used and the various terms and features of a table can be substituted with the features appropriate to the data source 110.

The display management component 140 first determines the minimum size of the content of the data source 110 that is readable by the user. This is illustrated at step 220. In the case of a table the display management component 140 takes into account the length of the content in each cell, the font size of the content, as well as any constraints that have been placed on the system by the user or from the table author. In some embodiments the display management component 140 may also receive information related to the size and type of display the user is using. Additional information that is informative with regards to the ability to display data from the data source 110 may also be collected at this point.

After determining the minimum size of the content that is displayable the display management component 140 determines if actual data can be displayed or if summary data should be displayed. This is illustrated at step 222. At this step the display management component 140 takes into account the whole of the data source 110 as well as the various features determined at step 220 above. In some embodiments the display management component 140 accesses the profile 126 at this step and uses the information contained in the profile 126 to assist in making the decision regarding whether to display summary data or data itself. Further, the display management component 140 can also use the information captured by the monitoring component 120 related to how the user changed the zoom level. That is the rate that the user changed the zoom level may be indicative of what the user desires to see. A fast zoom out is likely indicative of the desire to give up detailed information in order to get to a specific location or higher level information. This can, for example, be indicative of a desire for summary information as opposed to the actual data. This analysis can be equally applicable when the user changes the zoom level by a large percentage, for example going from 100% zoom level to 10% zoom level. Conversely if the user is very slowly changing zoom level or only slightly changing the zoom level this can be indicative that the user still prefers to see data. Once the external factors are considered the display management component 140 determines whether to display the summary data or at least a portion of the actual data. In one example, the display management component 140 considers if the available space on the display is sufficient that it can show a handful of cells from a large table or if a table summary would be more meaningful to the user than the handful of cells.

If the display management component 140 determines that at least a portion of the actual data should be displayed to the user the process continues along path 203. At step 224 the display management component 140 begins to consider what rearrangement of the cells in the table are required or desirable. Starting from FIG. 3, assuming a zoom out, the display management component 140 identifies each of the headers 301-309 in the table as well as each of the rows 351-356. It should be noted that the header and rows may have been previously identified by the content identification component. Also illustrated in FIG. 3 is a number of cells collectively referred to as cells 370 (not separately labeled). It should be noted that FIG. 3 only illustrates the portion of the data source 110 that makes up table 300. Additional cells, headers and rows are present in the table 300, but are not visible to the user directly. These additional cells, headers and rows may be brought into view through the user of slider bars and other forms of scrolling.

If for example the user were only slightly zooming out from the current view illustrated in FIG. 3 the display management component 140 may determine that no rearrangement of the data displayed is necessary. This may be caused by the user simply expanding the view to see an additional row or two or an additional header or two. In some embodiments the user may be able to provide an input to the system indicating that for a particular zoom that the user does not wish to have the display of the data rearranged. If the display management component 140 determines that no changes are necessary the data is rendered at step 230 and steps 225 and 226 are omitted.

If the display management component 140 determines that the data displayed should be rearranged or otherwise modified. At this step the display management component 140 determines how and what data to display to the user based on the information that is available to the system about the table and the user's profile. The display management component 140 can receive information from the monitoring component 120 through the profile 126 that indicates what portions of the data that the user is interacting with at the time of the zoom request. This information in the profile can include, in the case of a table, the columns and rows the user was interacting with, the edit history of each of the rows, or any other information related to how the user actually interacts with the table. For other data source 110s the display management component 140 may receive information about each of the items in the data source 110 and how the user interacts with them. The display management component 140 may also receive information from the context identification component 130 at this step to assist in determining if there is any additional information in the data source 110 that should be maintained or surfaced to the user in the zoom process. This information is combined with the other information including the minimum display size for a data item to determine the layout of the display.

Returning to the table of FIG. 3 and the user's intent to zoom out the display management component 140 determines that the way the columns are to be displayed should be changed. This is illustrated at step 225 of FIG. 2. The display management component 140 determines based on the table width and the minimal cell size for each column where to place each of the columns of the table. The display management component 140 considers placing the columns one by one, and then wrapping the next column to the "next line" if it that column is not going to fit in the available table width. In some embodiments the minimal cell size is modified such that the displaying table is in a rectangular shape, fitting in the boundary of the table. Alternatively, the boundary of the table could be adjusted accordingly to permit the column to fit. In some embodiments the display management component 140 identifies those columns that the user has indicated as most useful to them. This information can come from the profile 126 or from direct interaction from the user. Based on this information related to the usefulness of the columns the display management component 140 can further alter the display of the columns. For example, the display management component 140 can determine that certain columns can be omitted from the display as they are not informative. Alternatively the display management component 140 can determine that the important columns should be displayed first or predominately and the other columns should be placed after these columns. The display management component 140 can then determine that an indication that the columns have been rearranged in the display should also be presented to the user.

Once the number and arrangement of the columns has been determined the display management component 140 then proceeds to determine the number of rows that can be displayed in the table. This is illustrated at step 226. Based on the arrangement of the columns determined at step 225 and taking into account the height of the table determined at step 220 the display management component 140 determines the optimal number of rows that can be displayed for the zoom level. The number of rows that can be displayed can be any number of rows including zero. In other words the display management component 140 determines if all of the rows can be shown, some of the rows can be shown or if only the column headers can be shown. When determining that only some of the rows can be shown the display management component 140 can use the information from the profile 126 to determine which of the rows to display and which rows to remove or not display. Again this information may be based on the way the user uses the data in the table or based on other semantic analysis of the data that can indicate which rows are more or less informative about the overall table.

Once the display management component 140 has determined the specific way the data should be rendered for the particular zoom level, the display management component 140 renders the image and passes that image to the display. This is illustrated at step 230. In some embodiments the display may be rendered to a file for later retrieval by the user on the device.

Figure 5:
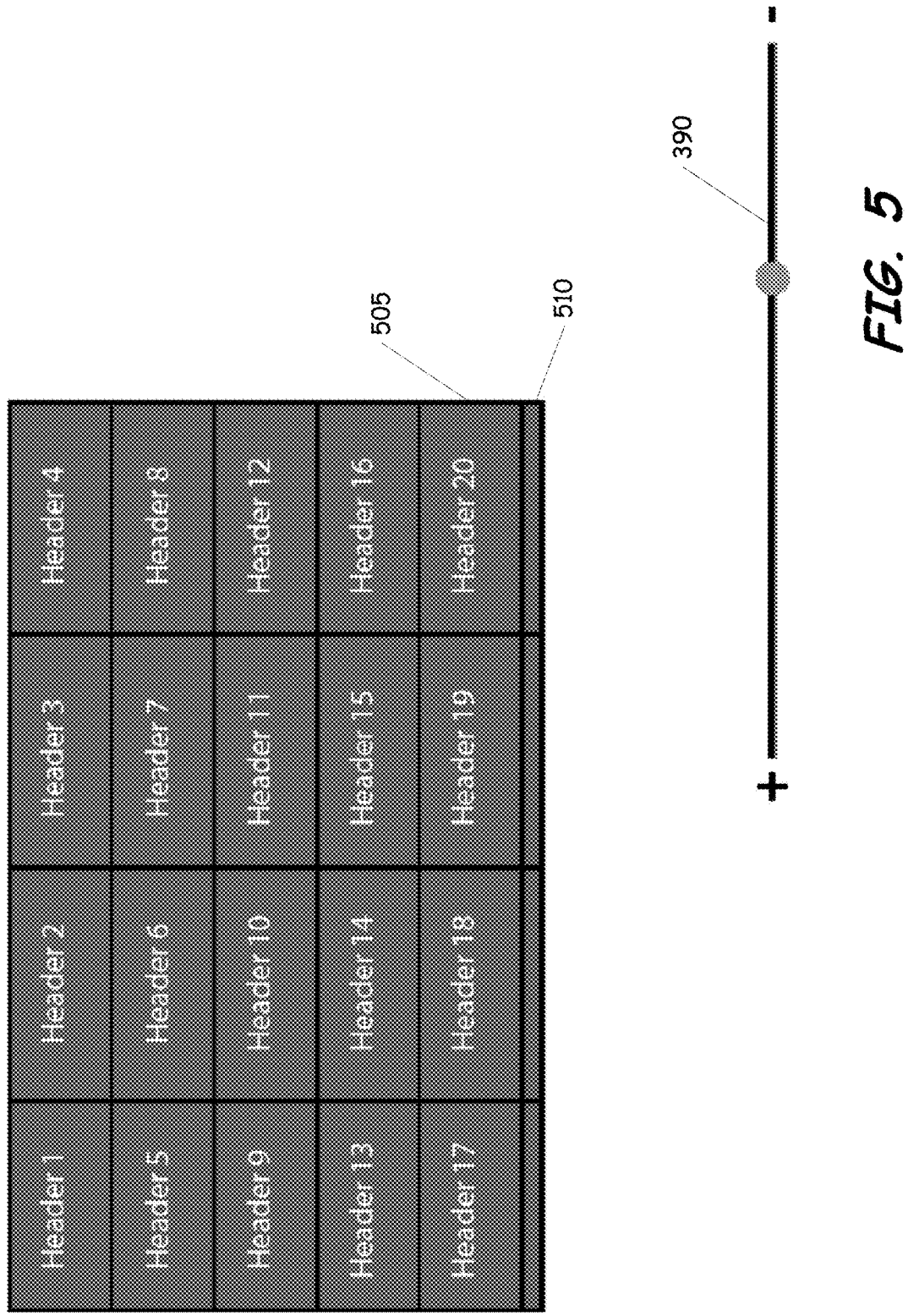
FIG. 5 is an exemplary screen shot illustrating a display of data in the spreadsheet where the data has been reorder or reduced.

FIG. 4 and FIG. 5 illustrate two potential zoom levels that the user may have selected as indicated by slider bar 390. FIG. 4 illustrates on intended zoom level and FIG. 5 illustrates a second intended zoom level. Both FIGS. 4 and 5 illustrate examples of a table where at least a portion of the data from the table is still displayed to the user at these zoom levels. In FIG. 4 the display management component 140 has determined that 27 of the headers can be displayed (which may represent all of the columns in the table) and that two of the rows may be displayed as well as sample rows. The display management component 140 in making this determination determined that that table width only permitted 9 headers to be displayed across and therefore wrapped the headers in three rows of headers for the full 27 headers. In FIG. 4 the display management component 140 determined to display the first two rows of the table as the sample rows. However, as discussed above the display management component 140 may select other rows to display based on the profile or other information. For example the rows may be the last two rows that were modified or the two rows that are the most similar to each other in terms of data. In FIG. 5 the display management component 140 has determined that only the header columns can be displayed and that no sample rows can be displayed at the zoom level. Further, the display management component 140 determined that not all of the column headers could be displayed. As such, the first 20 headers are shown displayed. The additional column headers are indicated to the user by the space between the bottom of the table 300 and the bottom of the header row 505 and labeled as 510. The user can view the additional header rows through the use of a scroll bar or other means (not illustrated). Again as mentioned previously, the display management component 140 may select other headers to display in header rows 501-505 based on the information in the profile 126 or other information made available to it about the importance of the columns or headers. For example the display management component 140 may move header 310 to the position that is currently held by header 302 if the display management component 140 determined that header 310 is more important than header 302. Further, headers that are not displayed in FIG. 5 currently could be brought into view if they are determined to be more important than the currently displayed headers.

In embodiments where the data source 110 is not a table, steps 225 and 226 can be combined into a single step or process. With other data source 110s the display management component 140 determines how much of the data source 110 can be displayed at the new zoom level. Once that is known by the data management component information from the profile 126 and the context identification component 130 are used to determine what information to display to the user in response to the requested zoom level. For example, in a word processing document the display management component 140 may determine that the first page of the document and the last page the user was working on are the pages to display to the user and in response to the zooming action adjust the display to show the these two pages without the other pages in between shown or may provide an visual indicator of the other pages is available. In an example where the data source 110 is pictures the display management component 140 may receive from the context identification component 130 information related to the subjects of the photos. In response to the zooming action the display management component 140 may only show one photo for each subject in the data source 110, or may choose to show only photos having a subject that appears more frequently than others.

Figure 6:
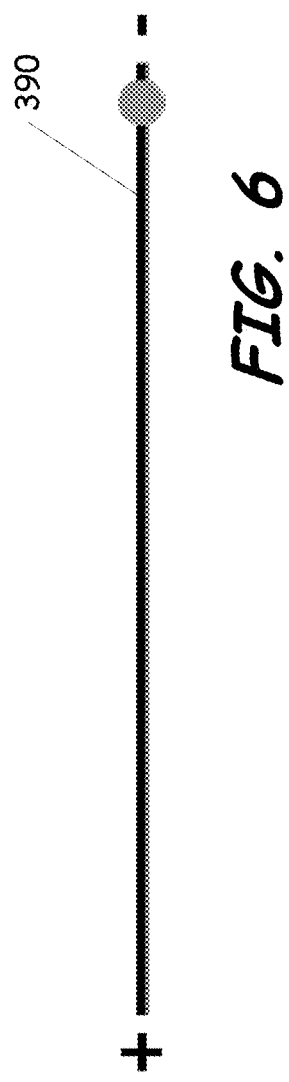
FIG. 6 is an exemplary screen shot illustrating a display where the data has been modified to show summary data of the underlying table.

However, if at step 222 the display management component 140 determined that the zoom level requires or indicates that summary data should be shown the process continues along line 204. At step 240 the display management component 140 determines what summary information that should be shown to the user. This information to be displayed can be based on the information surfaced by the context identification component 130 or from metadata associated with the data source 110. In the table example the summary data can include information related to the name of the table, the number of rows in the table, and the number of columns in the table. FIG. 6 illustrates one example of a table summary 600 that the display management component 140 may cause to be rendered when it is determined that summary data is appropriate for the zoom level. Depending on the type of the data source 110 other data may be shown as summary data. In the example where a table includes multiple tabs at a certain zoom level the summary may provide summary information for each of the tabs displayed in a manner to allow the user to determine which tab contains the table that the user is interested in viewing further. The arrangement of these tables in that view may not necessarily align with the order of the tabs in the underlying spreadsheet. In some embodiments instead of displaying written data about the underlying table such as the aforementioned tabs, columns and name, the display management component 140 may cause a graph or other visual display to be rendered. The display management component 140 can utilize features in the underlying program to generate this visual representation. In this way the display management component 140 is able to leverage the underlying program or application that is used to for the data source 110 to better provide the summary information to the user.

Following the determination of the summary information the display management component 140 causes the summary information to be displayed to the user on the display. This is illustrated at step 245. In some embodiments the summary information may be stored as file that can be displayed at a later time.

Returning back to the top of FIG. 2 and following along path 202 the process that occurs when the user is zooming in is now discussed. The process of zooming in is similar to the process of zooming out with the exception that instead of making a determination of what data can be removed from the view that is presented to the user, the system now determines what information can or should be added or surfaced to the user as they zoom in.

At step 270 the display management component 140 again first determines the minimum size of the content of the data source 110 that is readable by the user. In the case of a table, such as the table of FIGS. 3-6, the display management component 140 takes into account the length of the content in each cell, the font size of the content, as well as any constraints that have been placed on the system by the user or from the table author. In some embodiments the display management component 140 may also receive information related to the size and type of display the user is using. Additional information that is informative with regards to the ability to display data from the data source 110 may also be collected at this point. For purposes of this portion of the discussion it will be assumed that the user started at the summary table of FIG. 6. However, the process is the same regardless of where in the zoom level the user began.

After determining the minimum size of the content that is displayable the display management component 140 determines if actual data can be displayed or if summary data should continue to be displayed. This is illustrated at step 272. At this step the display management component 140 takes into account the whole of the data source 110 as well as the various features determined at step 270 above. In some embodiments the display management component 140 accesses the profile 126 at this step and uses the information contained in the profile 126 to assist in making the decision regarding whether to continue to display summary data or to display the data itself. Further, the display management component 140 can also use the information captured by the monitoring component 120 related to how the user changed the zoom level. That is the rate that the user changed the zoom level may be indicative of what the user desires to see. A fast zoom in is likely indicative of the desire to get to the detailed information right away. This analysis can be equally applicable when the user changes the zoom level by a large percentage, for example going from 10% zoom level to 100% zoom level. Conversely if the user is very slowly changing zoom level or only slightly changing the zoom level this can be indicative that the user is attempting to locate the specific area of data that the user may want to then zoom in on. Once the external factors are considered the display management component 140 determines whether to continue to display the summary data or to begin to display a least a portion of the actual data. In one example, the display management component 140 considers if the available space on the display is sufficient that it can show a handful of cells from a large table or if continuing to remain as a table summary would be more meaningful to the user than the handful of cells.

After determining whether to continue to display the summary data or to display at least a portion of the actual data in the display the display management component 140 follows along the corresponding path for the either rendering the summary data or the actual data. Steps 280, 282 and 284 are the steps executed when the display management component 140 determines to display at least a portion of the actual data. These steps are substantially similar to the steps discussed above with regards to steps 225, 226 and 230 above. The primary difference between the two paths is the direction of the zoom. Steps 286 and 288 are the steps executed when the display management component 140 determines to continue to display summary data to the user. These steps are substantially similar to steps 240 and 245 discussed above. Again the primary difference is the direction of the zoom whereby more summary data may be shown to the user as they zoom in.

The process discussed above with respect to FIG. 2 is repeated each time the user indicates a desire to change the current viewing zoom level of the display. Again while the above discussion focused on displaying information to the user from a table the discussion above is equally applicable to other types of data displays, such as documents, presentations, photos, contacts, etc. Further, additional information can be used to assist in determining whether to display the data or summary to the user, such as screen size, display resolution, device type, accessibility options etc. This information can cause the display management component 140 to show a summary display on one device and at least a portion of the data on a different device for the same zoom level.

Figure 7:
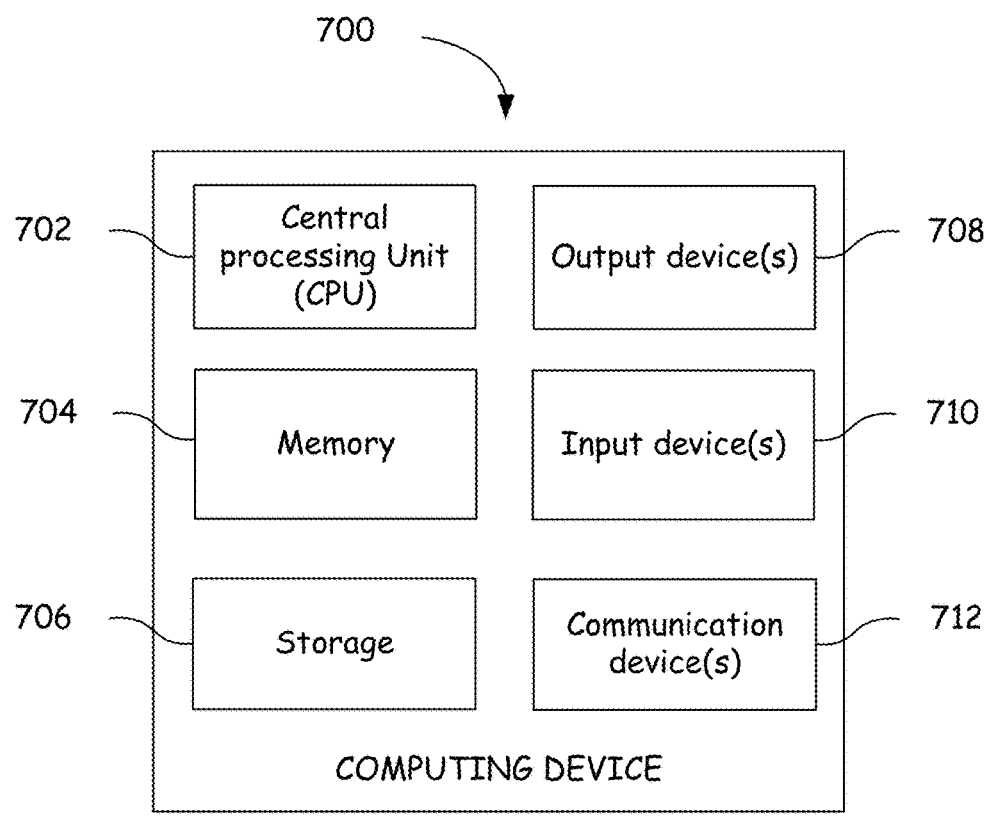
FIG. 7 illustrates a component diagram of a computing device according to one embodiment.

FIG. 7 illustrates a component diagram of a computing device according to one embodiment. The computing device 700 can be utilized to implement one or more computing devices, computer processes, or software modules described herein. In one example, the computing device 700 can be utilized to process calculations, execute instructions, receive and transmit digital signals. In another example, the computing device 700 can be utilized to process calculations, execute instructions, receive and transmit digital signals, receive and transmit search queries, and hypertext, compile computer code, as required by the system of the present embodiments. Further, computing device 700 can be a distributed computing device where components of computing device 700 are located on different computing devices that are connected to each other through network or other forms of connections. Additionally, computing device 700 can be a cloud based computing device.

The computing device 700 can be any general or special purpose computer now known or to become known capable of performing the steps and/or performing the functions described herein, either in software, hardware, firmware, or a combination thereof.

In its most basic configuration, computing device 700 typically includes at least one central processing unit (CPU) 702 and memory 704. Depending on the exact configuration and type of computing device, memory 704 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 706. Computer storage media includes volatile and nonvolatile, removable and non-removable media implemented in any method or technology for storage of information such as computer readable instructions, data structures, program modules or other data. Memory 704 and storage 706 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 712 that allow the device to communicate with other devices. Communications device(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 710 such as keyboard, mouse, pen, voice input device, touch input device, etc. Output device(s) 708 such as a display, speakers, printer, etc. may also be included. All these devices are well known in the art and need not be discussed at length. Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

In summary the present disclosure provides a system for providing a contextual zoom of a data source, comprising a display device configured to render a display of at least a portion of the data source. A monitoring component configured to detect at least one zooming action from a user on the data source. A context identification component configured to identify contextual information from the data source. The system further includes a display management component configured to modify the display based at least in part on the at least one zooming action and at least a portion of the contextual information. The display management component can be configured to modify the display from actual data from the data source to a summary of the data in the data source, reorder the data in response to zooming action, or remove at least a portion of the data from the display in response to the zooming action. The display management component may be further configured to determine a minimum cell size that can be displayed when the data is a table and the determine based on that cell size whether to display actual data, summary data or other information.

Further disclosed above is a method for displaying data from a data source on a display device. The system displays on the display device data from the data source at a first zoom level. Next the system receives an indication from a user of a change of the zoom level from the first zoom level to a second zoom level. It then determines if the display of the data should be modified based on the second zoom level. Finally it modifies the display of the data by changing at least a portion of the display such that the data is displayed at the second zoom level differently from the first zoom level. The modifications can include reordering data, summarizing the data or changing the format of the data that is displayed to the user through the display.

The invention claimed is:

1. A system for providing a contextual zoom of a data source, the system comprising:
   a display device configured to render a display of at least a portion of the data source;
   one or more computer processors; and
   persistent data storage having stored therein computer executable instructions which, when executed on the one or more computer processors, cause the system to:
   detect at least one zooming action on the data source;
   determine whether the zooming action is a zoom in or a zoom out;
   identify contextual information from the data source, the identified contextual information including at least a content and size of the data source, dimensions of the display, and information in the data source that enables understanding a portion of underlying data from the data source when displayed at a zoom level at which the data of data source cannot be viewed completely;
   based on the zooming action and on the identified contextual information:
   determine an amount of actual data to display;
   determine a minimum size of displayed content that is to be displayed;
   determine an amount of summary data to display, the summary data derived from a portion of actual data but displayed in lieu of the portion of actual data and the summary data determined at least in part from the information in the data source that enables understanding a portion of underlying data from the data source when displayed at a zoom level at which the data of data source cannot be viewed completely;
   determine a minimum size of data to be displayed;
   determine an arrangement of data to be displayed; and
   display on the display device the determined actual and summary data according to the determined minimum size and arrangement of the data to be displayed.

2. The system of claim 1 wherein the computer executable instructions further cause the system to detect a rate of zoom in the at least one zooming action.

3. The system of claim 1 wherein the computer executable instructions further cause the system to modify the display from actual data from the data source to a summary of the data in the data source.

4. The system of claim 3 wherein the summary data is based on meta data for the data source and not the actual data of the data source.

5. The system of claim 1 wherein the computer executable instructions further cause the system to reorder the data in response to zooming action.

6. The system of claim 1 wherein the computer executable instructions further cause the system to remove at least a portion of the data from the display in response to the zooming action.

7. The system of claim 1 wherein the data source is a table, the table having rows, columns and cells, each cell containing data, the table further having headers.

8. The system of claim 7 wherein the computer executable instructions further cause the system to:
   track interactions with the cells in the table; and
   reorder the display based on the interactions with the cells.

9. The system of claim 7 wherein the computer executable instructions further cause the system to determine a minimum cell size for a cell that can be displayed on the display.

10. The system of claim 9 wherein the computer executable instructions further cause the system to display summary data when a requested zoom level prevents displaying at least one of the cells at the minimum cell size.

11. The system of claim 10 wherein the summary data is presented in a format different from a format of the data source.

12. The system of claim 8 wherein the computer executable instructions further cause the system to display the headers as the display wherein the headers are displayed as a table and the display does not include any of the cells.

13. A method for displaying data from a data source on a display device comprising:
 displaying on the display device data from the data source at a first zoom level;
 receiving an indication of a change of the zoom level from the first zoom level to a second zoom level;
 determining whether the change of the zoom level is a zoom in or a zoom out;
 identifying contextual information from the data source, the identified contextual information including at least content of the data source, size of the data source, dimensions of the display, and information in the data source that enables understanding a portion of underlying data from the data source when displayed at a zoom level at which the data of data source cannot be viewed completely;
 based on the first zoom level, the second zoom level, and on the identified contextual information:
  determining an amount of actual data to display;
  determining an amount of summary data to display, the summary data derived from a portion of actual data but displayed in lieu of the portion of actual data and the summary data determined at least in part from the information in the data source that enables understanding a portion of underlying data from the data source when displayed at a zoom level at which the data of data source cannot be viewed completely;
  determining a minimum size of displayed content that is to be displayed;
  determining a minimum size of data to be displayed;
  determining an arrangement of data to be displayed;
 determining how the display of the data should be modified to effect the second zoom level; and
 modifying the display of the data by changing at least a portion of the display such that the data, including the determined actual and summary data, is displayed at the second zoom level according to the determined minimum size and arrangement of the data to be displayed.

14. The method of claim 13 wherein modifying comprises reordering the data in the display.

15. The method of claim 13 wherein modifying comprises presenting a summary of the data from the data source.

16. The method of claim 13 wherein modifying comprising presenting the data source in a format different from an original format of the data source.

17. The method of claim 13 wherein modifying comprises displaying summary data when the second zoom level is a zoom level that prevents the data from being readable and displaying data when the second zoom level is a zoom level that allows the data to be readable.

18. The method of claim 17 wherein modifying the display further comprises accessing a profile and modifying the display at least based on a portion of information contained in the profile.

19. A computer readable storage medium comprising computer executable instructions that when executed by a computer having at least one processor cause the computer to:
 render data from a data source at a first zoom level as a display on a display device;
 monitor interactions with the data source;
 detect a request to change the first zoom level to a second zoom level;
 determine whether the change in zoom level is a zoom in or a zoom out;
 identify contextual information in the data source, the identified contextual information including at least a content of the data source, size of the data source, dimensions of the display, and information in the data source that enables understanding a portion of underlying data from the data source when displayed at a zoom level at which the data of data source cannot be viewed completely;
 based on the first zoom level, the second zoom level, and on the identified contextual information:
  determine an amount of actual data to display;
  determine a minimum size of displayed content that is to be displayed;
  determine an amount of summary data to display, the summary data derived from a portion of actual data but displayed in lieu of the portion of actual data and the summary data determined at least in part from the information in the data source that enables understanding a portion of underlying data from the data source when displayed at a zoom level at which the data of data source cannot be viewed completely;
  determine a minimum size of data to be displayed;
  determine an arrangement of data to be displayed;
 modify the display based at least on a portion of the interactions and the identified contextual information such that the modified display presents data from the data source, including the determined actual and summary data, at the second zoom level according to the determined minimum size and arrangement of the data to be displayed; and
 render the modified display on the display device.

20. The computer readable storage medium of claim 19 wherein modifying the display further presents a summary of the data of the data source and the amount of actual data to display is zero.

* * * * *